United States Patent
Noronha et al.

(10) Patent No.: US 11,960,742 B1
(45) Date of Patent: Apr. 16, 2024

(54) HIGH-PERFORMANCE, BLOCK-LEVEL FAIL ATOMICITY ON BYTE-LEVEL NON-VOLATILE MEDIA

(71) Applicant: Oracle International Corporation, Redwood Shores, CA (US)

(72) Inventors: Ranjit Mario Noronha, Bengaluru (IN); Sumanta Chatterjee, Fremont, CA (US); Margaret M. Susairaj, Sugar Land, TX (US)

(73) Assignee: Oracle International Corporation, Redwood Shores, CA (US)

( * ) Notice: Subject to any disclaimer, the term of this patent is extended or adjusted under 35 U.S.C. 154(b) by 25 days.

(21) Appl. No.: 17/966,737

(22) Filed: Oct. 14, 2022

(51) Int. Cl.
*G06F 3/06* (2006.01)

(52) U.S. Cl.
CPC .............. *G06F 3/064* (2013.01); *G06F 3/061* (2013.01); *G06F 3/0656* (2013.01); *G06F 3/0679* (2013.01)

(58) Field of Classification Search
CPC ........ G06F 3/064; G06F 3/061; G06F 3/0656; G06F 3/0679
USPC .................................. 711/154, 100
See application file for complete search history.

(56) References Cited

U.S. PATENT DOCUMENTS

| | | | |
|---|---|---|---|
| 10,019,320 B2 | 7/2018 | Talagala | |
| 10,261,913 B2 | 4/2019 | Zhou | |
| 2007/0033378 A1* | 2/2007 | Sinclair | G06F 3/0652 |
| | | | 711/E12.008 |
| 2011/0022790 A1 | 1/2011 | Fachan | |
| 2019/0057024 A1* | 2/2019 | Tripathi | G06F 3/0644 |
| 2019/0073296 A1 | 3/2019 | Atkisson | |
| 2019/0294365 A1* | 9/2019 | Yoshii | G06F 3/0647 |
| 2021/0326266 A1 | 10/2021 | Curtis-Maury | |

OTHER PUBLICATIONS

Von Behren, Paul, "NVML: Implementing Persistent Memory Applications", SNIA Global Education, https://www.snia.org/sites/default/files/Paul_von_behren_NVML_Implementing_Persistent_Memory.pdf, dated Feb. 2015, 28 pages.

Kalita et al., "DurableFS: A File System for Persistent Memory", doi.org/10.48550/arXiv.1811.00757, dated Nov. 2018, 6 pages.

(Continued)

*Primary Examiner* — David Yi
*Assistant Examiner* — Zubair Ahmed
(74) *Attorney, Agent, or Firm* — Hickman Becker Bingham Ledesma LLP

(57) ABSTRACT

Techniques are provided for block-level fail atomicity on byte-level non-volatile media. In one technique, an offset table and application data that stores content of a file are stored for a file. The offset table includes multiple entries, each entry being associated with a different offset value and storing a logical block address (LBA) that references a location in the application data. In response to receiving a request, that includes an input buffer and an offset value, to update the file: (a) an entry, in the offset table, that corresponds to the offset value and comprises a first LBA is identified; (b) a second LBA that is considered free is identified; (c) the second LBA is replaced with the first LBA; (d) the input buffer is written to a location, in the application data, that the second LBA references; and (e) the second LBA is added in the entry.

20 Claims, 8 Drawing Sheets

(56) References Cited

OTHER PUBLICATIONS

Kadekodi et al., "WineFS: A Hugepage-Aware File System for Persistent Memory that Ages Gracefully", Proceedings of the ACM SIGOPS 28th Symposium on Operating Systems Principles, dated Oct. 2021, 15 pages.
Izraelevitz et al., "Failure-Atomic Persistent Memory Updates via JUSTDO Logging", ACM SIGARCH Computer Architecture News, vol. 44, Iss. 2, dated May 2016, 16 pages.
Gupta et al., "Distributed Logless Atomic Durability with Persistent Memory", Proceedings of the 52nd Annual International Symposium on Microarchitecture, IEEE/ACM, dated Oct. 2019, 13 pages.
Chen et al., "HiNFS: A Persistent Memory File System with Both Buffering and Direct-Access", ACM Transactions on Storage, vol. 14, Iss. 1, dated Feb. 2018, 30 pages.
Cai et al., "Understanding and Optimizing Persistent Memory Allocation", Proceedings of the 2020 ACM SIGPLAN International Symposium on Memory Management, dated Jun. 2020, 14 pages.
Cai et al., "HOOP: Efficient Hardware-Assisted Out-of-Place Update for Non-Volatile Memory", 47th Annual International Symposium on Computer Architecture, ACM/IEEE, dated May 2020, 13 pages.

* cited by examiner

340

| Entry 1: Offset | Entry 2: Offset | Spare Bytes |
| LBA1 *LBA2* | *LBA1* LBA2 | |
| State | State | |

Line 0 ... Line 64

*FIG. 3B*

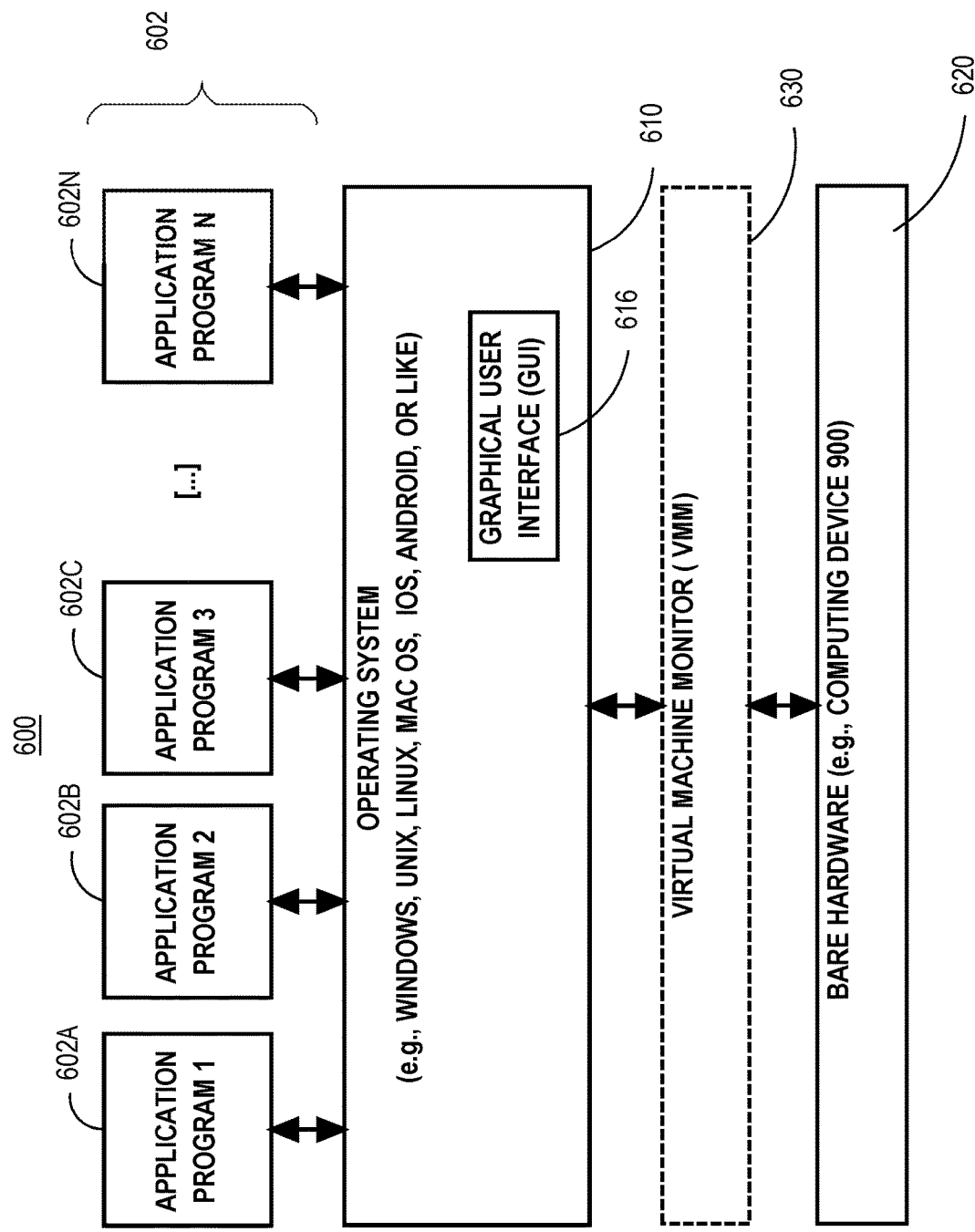

HIGH-PERFORMANCE, BLOCK-LEVEL FAIL ATOMICITY ON BYTE-LEVEL NON-VOLATILE MEDIA

TECHNICAL FIELD

The present disclosure relates to non-volatile media and, more particularly to, providing block-level fail atomicity on byte-level non-volatile media.

BACKGROUND

There are two main types of storage: volatile storage media and non-volatile storage media. Each main type has multiple sub-types. For example, volatile storage media includes RAM (random access memory) and different levels of cache that are near a micro-processor. Examples of non-volatile storage media include disk storage and solid state devices. Another category of non-volatile storage media is "persistent memory," which combines traits of both volatile memory and storage devices. Similar to volatile DRAM, persistent memory is byte addressable and is located on the memory bus. Similar to non-volatile storage, persistent memory retains its contents when an unexpected crash occurs, such as a power failure.

Persistent memory is an inflection point in the memory hierarchy. The latency of a byte-level access to or from persistent memory is higher than volatile memory, but lower than non-volatile storage devices, such as disks and SSDs. Being on the memory bus, persistent memory is accessed via the cache hierarchy.

Access and atomicity granularity is similar to dynamic memory. Persistent memory may be accessed at byte-level granularity. The actual media is accessed at a cache line granularity. This gives applications byte-level granularity at a cache line size block access. The contents of persistent memory are retained even after the power goes out. Deploying persistent memory to store database files may potentially improve the performance of database I/Os and overall transactional performance.

Traditional database accesses underlying storage at a storage-provided block-level granularity that guarantees atomicity. This allows the database to be recovered without any data loss if there is an instance crash in the middle of a block update. For many databases, power-fail, block-level atomicity at a block size of 512 bytes or higher multiple is expected. The database expects the underlying storage system to have an atomicity guarantee of a minimum of 512 bytes or a multiple of that. Thus, if the underling storage supports an atomicity of 4 KB, then a block will contain the complete contents of the entire 4 KB input block or the block will be unchanged. The block in the storage will not have a mix of the previous block and the new block.

Persistent memory may be exploited using a Direct Access (DAX) capable filesystem, such as XFS (a high performance, open source filesystem) or ext4. DAX-capable filesystems enable a user to create files and access and store data in these files hosted on persistent memory. Therefore, database files may be hosted on DAX-capable persistent memory media. As a result, a database instance can then experience an increase in performance from the lower latencies on persistent memory relative to traditional non-volatile storage media, such as a disk.

When files are hosted on a traditional PO SIX filesystem, such as XFS, blocks are overwritten in-place on the storage media. In traditional storage media, the power-fail block-level atomicity is 512 bytes or higher. Thus, during failure scenarios, at a granularity of 512 bytes, either the contents of the old block are retained, or the block completely contains the contents of the new blocks. No intermediate state between the old and the new blocks is possible.

Some databases piggyback on this behavior by requiring power-fail atomicity at a granularity of 512 bytes or higher. However, some persistent memory devices provide power-fail atomicity at a granularity of a cache line, which is typically lower, such as at 64 bytes. Therefore, in certain failure cases, for 512 byte blocks or higher, the resulting block may have a mix of the old state and new state. A database will not be able to recover these mixed state blocks. The mismatch between (a) the atomicity requirements of some database files and (b) the atomicity offered by hardware may result in the files becoming corrupted. This atomicity coverage gap prevents files of some databases from being hosted directly on persistent memory media.

A few approaches exist to address this potential corruption issue upon a crash or failure. One approach involves modifying applications that operate on database files to be aware of the smaller block size on persistent media. However, this approach requires significant, non-trivial changes to applications. Another approach is to log the I/Os to an append only log requiring extra copies. However, this approach requires extra storage space and time to process.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3B is a block diagram that depicts an example free space log, in an embodiment;

FIG. 6 is a block diagram of a basic software system that may be employed for controlling the operation of the computer system.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for addressing an atomicity coverage gap between volatile memory and non-volatile storage media. In one technique, contents of a file are stored in persistent memory along with metadata of the file. The metadata comprises two data structures: an offset table and a free space log. The offset table comprises multiple entries, each entry potentially pointing to a different block into an array of blocks that stores the contents of the file. An offset into the offset table is associated with an offset into the array of blocks. When a block is updated, an out-of-place write occurs, which involves identifying an available (or free) block to which the update will be written. The free space log is used to identify the free block. If a crash occurs during a certain stage of updating the free space log, then the previous contents are easily and quickly recoverable.

Embodiments described herein improve computer-related technology. For example, embodiments do not require any modifications to the underlying database and do not require any extra temporary copies of writes. Also, crash recovery is constant and depends on the size of the free space log, which is relatively small.

Example Storage System

Figure 1:
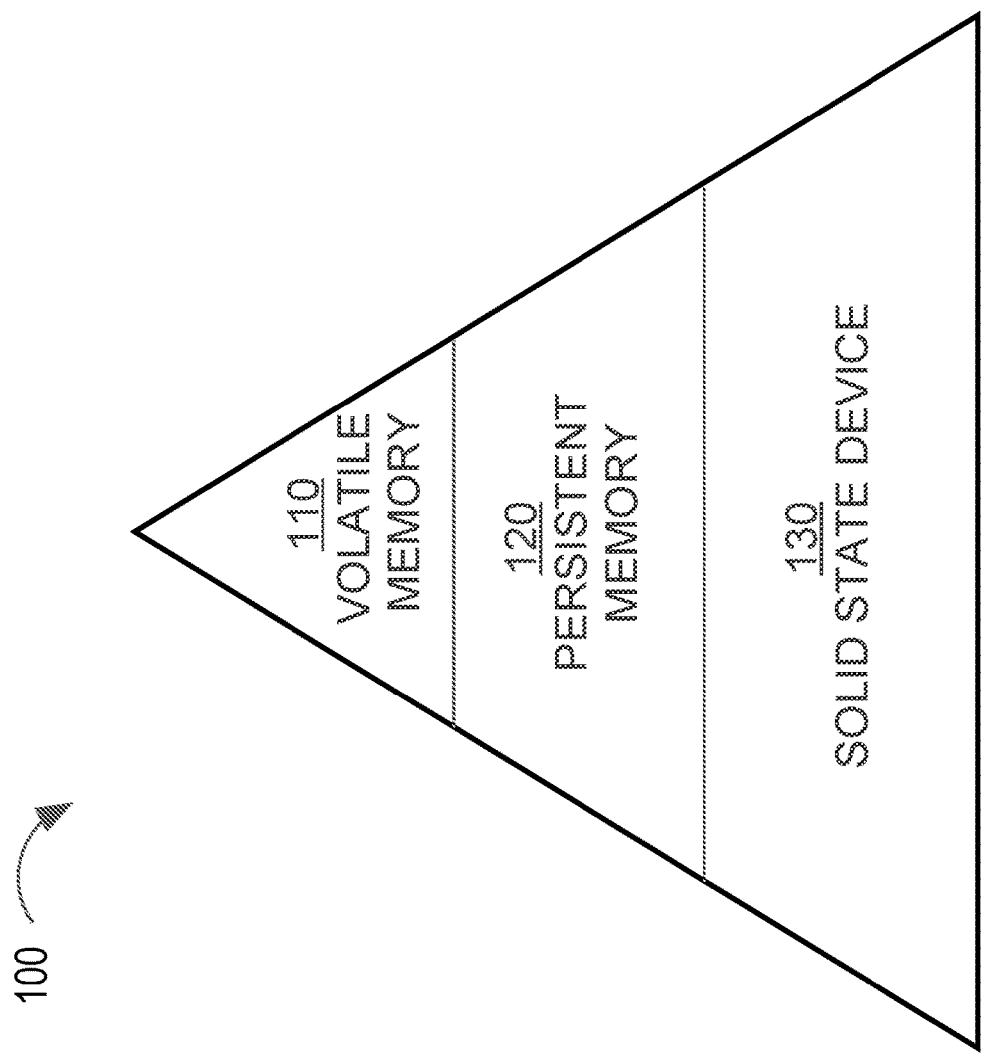
FIG. 1 is a block diagram that depicts an example storage media hierarchy, in an embodiment.

FIG. 1 is a block diagram that depicts an example storage media hierarchy 100, in an embodiment. Storage media hierarchy 100 comprises volatile memory 110 (e.g., DRAM), persistent memory 120, and a solid state device (SSD) 130. The pyramid shape indicates that the amount of space available in each type of storage increases from volatile memory to SSD. Also, data flows from volatile memory to persistent memory to SSD and vice versa, i.e., from SSD to persistent memory to volatile memory.

Figure 2:
FIG. 2 is a block diagram that depicts components in an example storage system, in an embodiment.

FIG. 2 is a block diagram that depicts components in an example storage system 200, in an embodiment. Storage system 200 includes a database instance 210, a storage manager 220, a memory speed file system 230, a direct access (DAX) component 240, and persistent memory 250. Database instance 210 is a set of memory structures that manage database files and serves the users of the database. Storage manager 220 is an interface between database instance 210 and memory speed file system 230. Similarly, DAX component 240 is an interface between memory speed file system 230 and persistent memory 250, which persistently stores a set of physical files. Persistent memory 250 may be part of one or more memory devices.

Each component above persistent memory 250 in storage system 200 communicates a data request or requested data with an adjacent component. For example, a data request originates from an application executing on database instance 210, which forwards the data request to storage manager 220, which forwards the data request to (and in a format expected by) memory speed file system 230, and so forth. Similarly, data read by DAX component 240 from persistent memory 250 is passed to memory speed file system 230, which passes the data to storage manager 220, which forwards the data to database instance 210.

Memory speed file system (MSFS) 230 plugs the atomicity coverage gap. MSFS 230 is a user-space file system that supports input/output (I/O) to persistent memory 250. MSFS 230 provides a file-level interface that is exploited by database instance 210 via storage manager 220. While MSFS 230 may maintain power-fail write atomicity of any size, for purposes of this description, MSFS 230 is said to maintain power-fail write atomicity of 4 KB.

Before describing how embodiments enable power-fail write atomicity of 4 KB while retaining the performance envelope of the underlying hardware, in order to enhance understanding, key concepts and data structures related to MSFS 230 are described. First, MSFS 230 divides files into 4 KB blocks. (A file may correspond to any type of data in any format, such as a word processing document, rows in a relational table, audio data, video data, etc.) Blocks of a file are numbered from 0 to size/4096-1, where size is the size of the underlying file in bytes. Each block number is called the Logical Block Address (LBA) of the corresponding block. An LBA may be quickly converted into a virtual address, which addresses a specific physical location in persistent memory 250

File Metadata

Figure 3A:
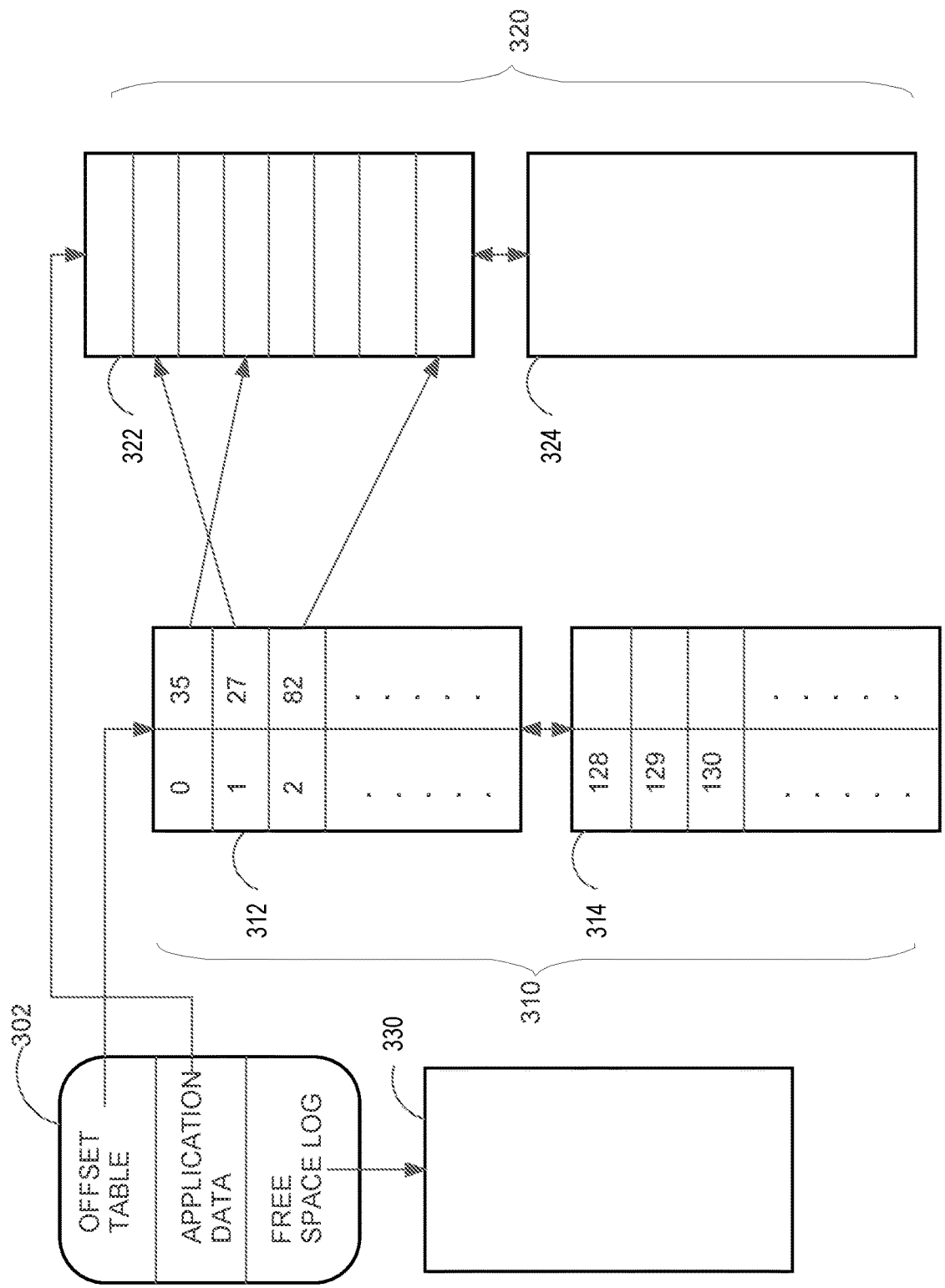
FIG. 3A is a block diagram that depicts example file metadata that are generated for a file that is stored in the example storage system, in an embodiment.

Second, each file is associated with metadata that is created upon creation of the file. Each file metadata structure may be contained in blocks of equal size, such as 4 KB. FIG. 3A is a block diagram that depicts example file metadata 300 that is generated for a file that is stored (as application data 320) in persistent memory 250, in an embodiment. Also stored in persistent memory 250, file metadata 300 comprises an offset table 310 and a free space log 330. File metadata 300 may also include reference data 302 that is used to locate offset table 310, application data 320, and free space log 330.

Offset table 310 and application data 320 may be implemented as segmented arrays. Initially, each offset table 310 and application data 320 may each comprise a single array of contiguous blocks. Offset table 310 maintains an entry pointer for each offset location in the corresponding file. Application data 320 is an array of (e.g., 4 KB) blocks that covers the file length. Each entry in offset table 310 points to a block in application data 320. During a read or write (I/O) operation that includes an offset value into offset table 310, the appropriate entry in offset table 310 is located using that offset value.

For example, if a file is a 1 MB upon creation of the file, then application data 320 may initially comprise a single segment 322 of 256 consecutive 4 KB blocks. Also, offset table 310 may initially comprise a single (4 KB) segment 312 of 256 8-byte entries. If the file increases in size beyond 1 MB, then another segment 324 is added to application data 320 and another segment 314 is added to offset table 310.

Offset table 310 provides the capability of mapping any block in application data 320 to any offset. MSFS 230 leverages this multi-block mapping capability to orchestrate block-level atomicity. When a (e.g., 4 KB) block needs to be written to application data 320 (i.e., in response to a database application sending the block to the MSFS 230 via storage manager 220), MSFS 230 uses an unused block (rather than the old/current block corresponding to the updated contents) as the destination of the incoming block. (This use of an unused block rather than the old block is referred to as an out-of-place write.) Once the write completes, a pointer in offset table 310 is updated to point to the newly written block. The old block is moved to an unused block list and may be reused for a subsequent write.

By keeping a pool of free blocks, write-level atomicity may be achieved. While a write-in-place approach writes a data block to the same physical location when the data block is modified, the write-out-of-place approach writes a modified data block to a new physical location. An out-of-place write does not directly modify the current contents of the file. Instead, such a write modifies a temporary buffer and later maps the temporary buffer to an appropriate file location. If writes were in-place writes, then a crash during an in-place write of a block might result in a block with mixed contents. Recovering from that scenario would be impossible unless a copy of the in-place write is first stored before the in-place write is performed. Replacing traditional filesystem in-place writes with out-of-place writes is a feature of embodiments described herein.

Initially, the contents of a file are ordered such that the first set of content of the file is maintained in the first block in application data 320, the second set of content of the file is maintained in the second block of application data 320, and so forth. Thus, the first offset (indicated in the first entry) of offset table 310 would contain a LBA of 0, the second offset (indicated in the second entry) of offset table 310 would contain a LBA of 1, and so forth. However, after a number of out-of-place writes, the order of the contents of the file will not be consecutive blocks in application data 320, as FIG. 3A indicates.

Maintaining the crash-consistency of a free space pool is important for correctness. After a crash or other abnormal termination (such as a power failure), one way to find the entries in the free space pool is to pass over the entirety of offset table 310. Blocks associated with a file but not found in offset table 310 constitute a free space pool. Determining the set of free blocks requires going through all the entries in offset table 310. This determination is only made during recovery after a crash. Free space pool recovery time would, therefore, be proportional to the size of the file. Recovery must be performed before any write is executed. Therefore, it is important to improve the time needed to recover entries in the free space pool. The following description regarding free space log 330 allows for the speed up in time to recover from a crash.

However, embodiments are not limited to a free space log implementation. In an embodiment, without a free space log, a record of free blocks (i.e., a record identifying blocks in application data 320 that are free; or "free space list") is written to persistent memory 250 when a file is closed. That record (or list) is read back from persistent memory 250 the next time the file is opened. Also, a write operation may be processed in one of many ways. For example, with a list of free blocks (or list of entries that include an LBA to a free block), a write thread locks one of the entries in that list, then writes the data in the write request at the block referenced by the LBA indicated in the locked entry, then updates that entry with the LBA of the previous version of the block that was being updated so that that LBA can be reused in a subsequent write. As another example, each entry in offset table has a "sister block." In other words, each used offset entry has two blocks, one free and one used. Then, in response to a write request to a block, the appropriate entry is located, the free "sister" block is written to, and the identified entry is updated to indicate that the free block is used and that the used block is free.

However, file open and file close are frequent operations. Writing a record of free blocks (1) slows down the file open and file close operations; (2) increases traffic to/from persistent memory 250 during normal operation; and (3) increases wear of persistent memory 250. In the embodiment where a free space log is leveraged by writing to free space entries in-place, the overhead of writing a record of free space blocks at file close and file open is eliminated, along with the associated disadvantages.

Free Space Log

Embodiments herein reduce crash recovery time by leveraging free space log 330, which reduces the cost of recovery.

FIG. 3B is a block diagram that depicts an example free space log 340, which is a detailed version of free space log 330, in an embodiment. Free space log 340 may be stored in a single block and may remain unchanged in size regardless of the size of the corresponding file. An example size of free space log 340 is 4 KB. This single block may be broken down into smaller byte entries, such as 64 bytes. Each 64-byte entry may be hosted in a cache line. Unlike other types of non-volatile storage, because persistent memory 250 is directly plugged into the memory hierarchy, data from persistent memory will be in L1, L2, etc. cache hierarchy during normal operation. Therefore, each 64-byte entry from free space log 340 may be stored in a cache line close to the CPU.

In this example, there could be 64 such lines (4 KB/64 bytes per line=64 line). Each line is composed of two free space entries of 25 bytes each. Thus, there are 128 free space entries in this example, which means that there may be 128 simultaneous writes. In other words, the number of simultaneous or concurrent writes that may be supported in this storage system is equal to the number of entries in free space log 340. However, it is possible for the free space log 340 to be a single entry, in which case all writes would be serialized and simultaneous writes would not be allowed. Thus, increasing the number of entries in free space log 340 increases the concurrency of writes.

Continuing with this example, each individual free space log entry has 8 bytes for an offset entry and two 8-byte logical block entries referred to as "LBA1" and "LBA2." Each free space entry also includes a one byte entry (referred to as "State") that serves as a flag to indicate whether the block referenced by the corresponding LBA is free and available for use. A block is "free" if the block is not referenced in offset table 310. At any one time, either LBA1 or LBA2 is free and available for use. That means 14 bytes (64 bytes−25 bytes−25 bytes=14 bytes) in a cache line are unused and may be used for additional optimizations. In the figures, an italicized LBA indicates that the LBA is free.

In the depicted example, the first entry at line 0 has LBA2 free, while the second entry at line 0 has LBA1 free. Given the size specifications above of 64 entries in free space log 340 and given that each entry should have a free LBA associated with it, a total of 128 blocks of 4 KB size should be allocated. Therefore, −0.5 MB (or 128*4 KB) should be allocated for data referenced by free space log 340, which size represents is a per-file overhead.

File Update

Figure 3C:
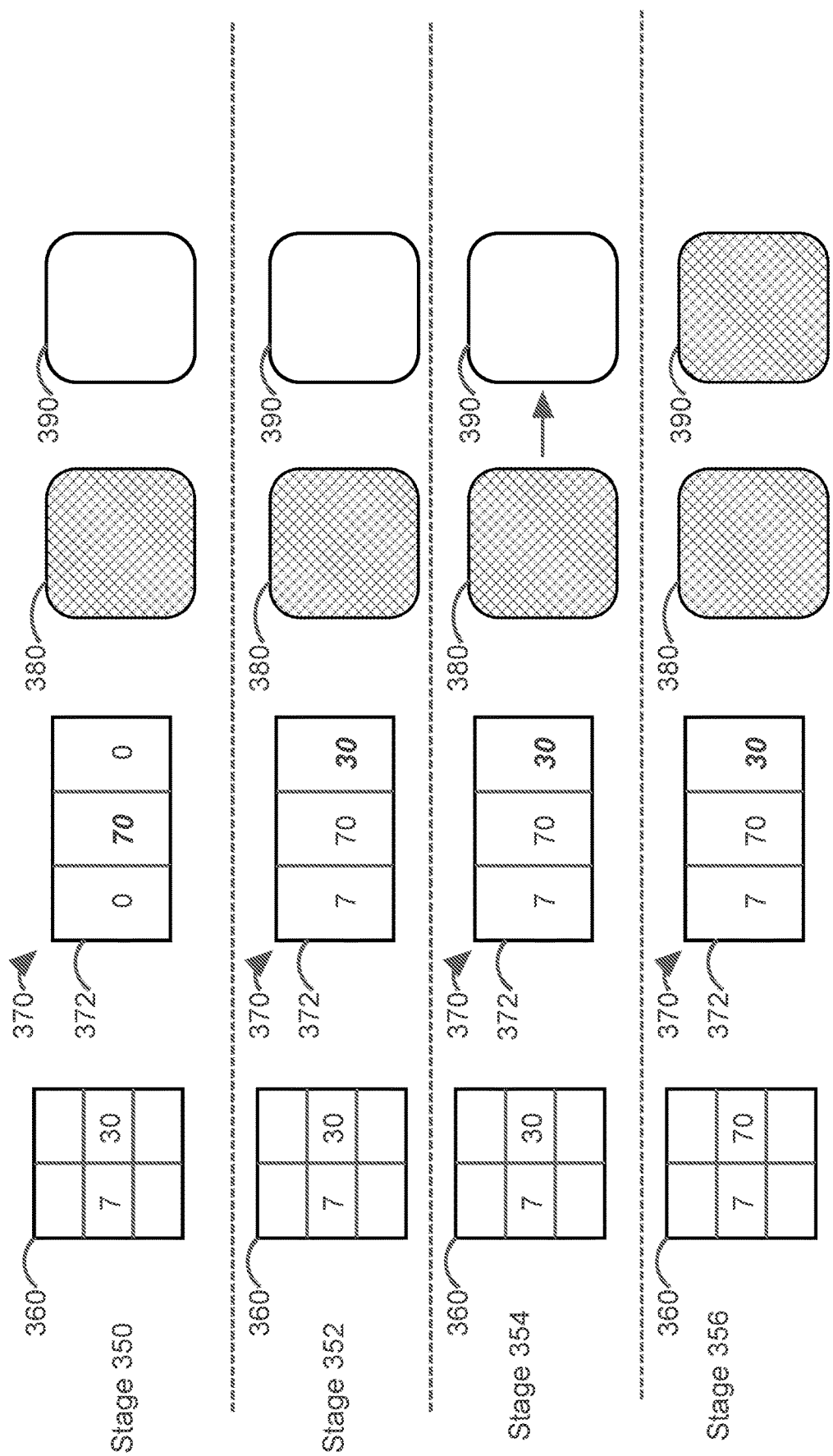
FIG. 3C is a block diagram that depicts stages of an offset table and a free space entry in response to an update, in an embodiment.

FIG. 3C is a block diagram that depicts stages 350-356 of a portion 360 of offset table 310 and a free space entry 370 in response to an update to a file, in an embodiment. In other words, FIG. 3C illustrates how these two file metadata structures are used to process the update. The left column of portion 360 includes an offset value and the right column includes a corresponding LBA. The left column 372 of free space entry 370 contains an offset value, the middle column of free space entry 370 contains the LBA1 value, and the right column of free space entry 370 contains the LBA2 value. Also, in free space entry 370, the free LBA is marked in italics. The action that triggers the use of these two data structures is receipt of a write request to write (or copy) an input buffer 380 (comprising a 4 KB block) at offset 7. In response to receiving the write request, MSFS 230 identifies an LBA 30 as being mapped to offset 7 in portion 360 of offset table 310.

At stage 350, which is an initial stage before the write request is processed, (1) offset 7 is mapped, in offset table 360, to LBA 30 and (2) free space entry 370 maps its offset value to 0 and indicates that LBA 70 is free (indicated by italicization in FIG. 3C). When free space log 340 (in FIG. 3B) is created, all entries in that log may initially have an offset value of 0. Also, each LBA1 may be set to a positive value and each LBA2 may be set to 0. There is no duplication of LBA2 in free space log 340.

Because free space entry 370 has not been used yet, LBA2 is mapped to 0. In response to each write request, MSFS 230 may scan free space log 340 until an entry is found that is not locked by another process or thread. Because free space entry 370 is not locked by another process or thread, stage 350 involves selecting free space entry 370 for updating. (If MSFS 230 is a single-threaded process, then no locking (and, thus, no lock checking) is required; also, there would only need to be a single entry in free space log 340. This is only if MSFS 230 is writing a single block at time. If there are multiple blocks in a write request, then multiple free space entries will be used, as described in more detail herein. Other than this selection, no updates to free space entry 370 or offset table 360 are performed at this stage.

At stage 352, MSFS 230 performs four operations. In a first operation, offset entry 372 in free space entry 370 is updated to 7, which is associated with a block that is to be updated. In a second operation, LBA2 is set to 30. In a third operation LBA2 is marked (or set to) free and LBA1 is marked (or set to) not free. The third operation must be performed last; otherwise, offset entry 372 would be corrupted. For example, if the third operation is performed first and then a crash occurs, LBA2 would be marked free even though LBA 2 may be mapped to an offset. Also, LBA1 would be lost.

At stage 354, MSFS 230 copies input buffer 380 to block 390, which is referenced by LBA 70. No updates to free space entry 370 or offset table 360 are performed at this stage.

At stage 356, after the copy completes, the contents of block 390 (which is referenced by LBA 70) mirror the contents of input buffer 380. Also at stage 356, MSFS 230 updates the entry of offset table 360 at offset 7 to LBA 70 from its previous value of LBA 30. This completes the update that is performed in response to a write. In this way, the block in application data 320 at LBA 30 is released and may be used in a subsequent write.

Crash Recovery

After a crash occurs, recovery begins by examining every free space entry in the free space log (330 or 340). For each entry in free space log 330, the LBA mapped in offset table 310 at the offset stored in that free space log entry is retrieved. If the LBA from the offset table matches the free LBA in the free space log entry, then the free space log entry flag should be flipped to mark the other LBA entry free.

The following are a few cases of when a crash might occur while updating a free space entry and how the recovery happens. If there is a crash prior to updating the offset entry in the free space entry 370 (i.e., before stage 352), then no recovery is needed. If the crash occurs after updating the offset value in free space entry 370, but before LBA2 is marked free (since LBA1 is still marked free) (i.e., before stage 354), then no recovery is needed. If the crash occurs after stage 354 completes, but before stage 356 completes, then the free space entry should be updated to mark LBA1 free. The offset value in free space entry 370 does not need to change, nor does LBA2 need to change. If the crash occurs after stage 356, then no recovery is needed.

Because free space log 340 has a limited number of entries (128 in the example of FIG. 3C), recovery time is constant and bounded. Recovery time may be further reduced by using the 14-spare bytes to indicate whether the free space entries in that line are in-flight or free. Lines with no free space entries in-flight can be skipped over. In the common case where no recovery is needed, a maximum of 64-bytes needs to be evaluated after a crash (i.e., 1 bit for each free space entry, 2 bits per line that fit in a single byte, 64 lines; therefore, 64 bytes), making the common case fast. A free space log that reduces free space pool recovery from a linear time to a constant time is a significant benefit.

Flushing

Persistent memory is updated a cache-line length at a time. In examples herein, a cache line is 64 bytes and memory is updated a cache line at a time. One way to reduce the number of updates to persistent memory is to update an entire cache-line in MSFS 230 and then flush the cache-line to persistent memory 250. During a write, besides the data to be written to the blocks in persistent memory 250, control structures such as the offset table and free space log need to be written to persistent memory 250. In an embodiment, to reduce the number of cache-line flushes to persistent memory 250, multiple (e.g., eight) offset table entries are updated at a time before flushing. This means that MSFS 230 queues (or batches) a set of writes and then writes (to persistent memory 250) the set of writes in a single batch. Correspondingly, the same number of free space entries are updated at the time before flushing. This reduces the number of cache line flushes. This optimization may be applied whenever the I/O size permits it. I/Os with sizes larger than 4 KB may exploit this optimization. 4 KB is a standard I/O block size. I/Os of 32 KB or larger may fully exploit a single offset table cache line flush for every eight offset table entries.

Process Overview

Figure 4:
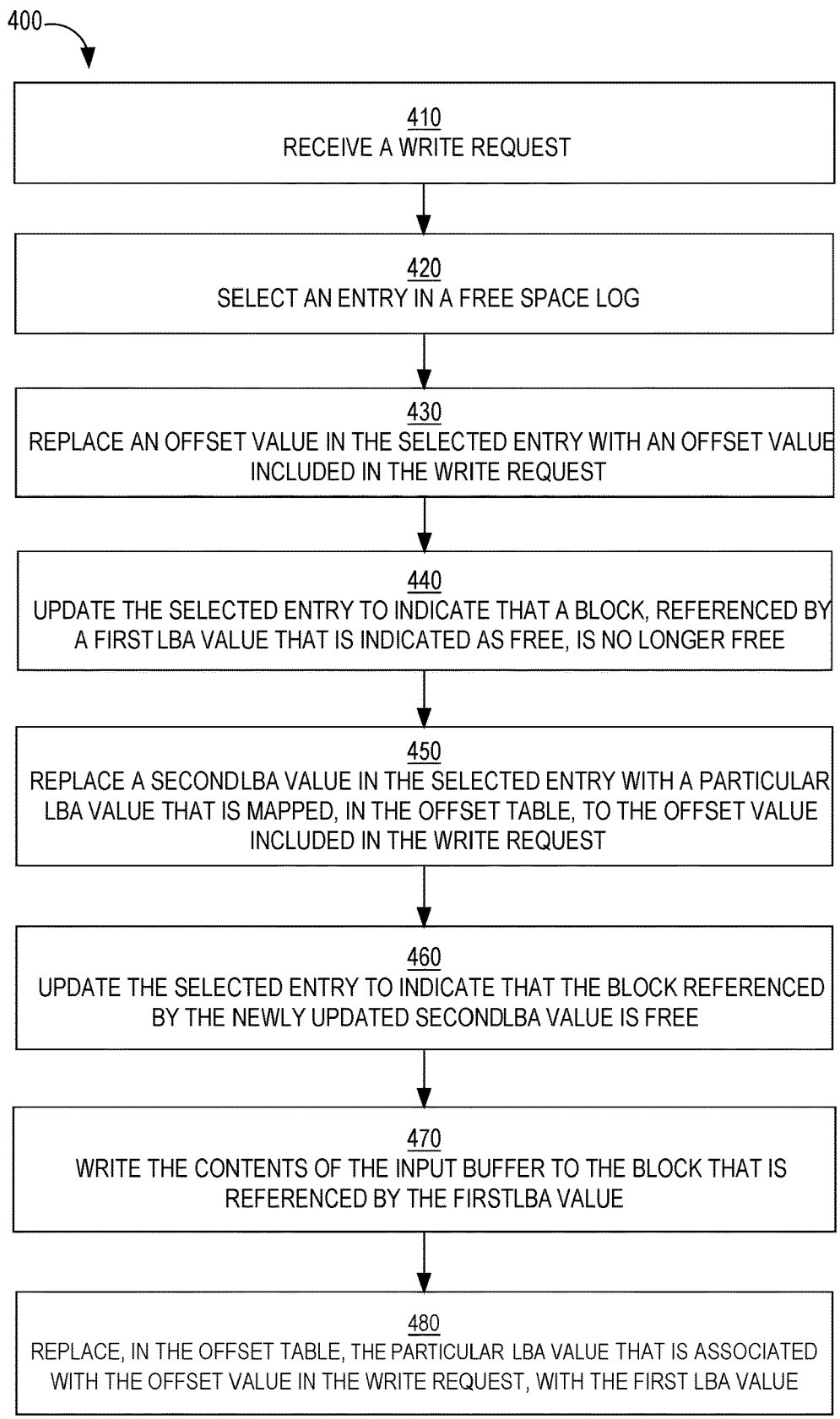
FIG. 4 is a flow diagram that depicts an example process for processing an update using the file metadata, in an embodiment.

FIG. 4 is a flow diagram that depicts an example process 400 for processing an update using the file metadata, in an embodiment. Process 400 is performed by MSFS 230.

At block 410, a write request is received. The write request includes an offset value, but not an LBA, which is determined after indexing into offset table 310 based on the offset value. The write request also includes an input buffer of data, such as 4 KB of data, that is to be written in application data 320 stored in persistent memory 250.

At block 420, an entry in free space log 340 is selected. Block 420 may involve scanning free space log 340 (e.g., in order) until an available entry is identified. An available entry is one that is not locked by another thread. Block 420 may also involve requesting (e.g., from a lock manager, not depicted) and obtaining a lock on the selected entry so that other threads do not process the same free space entry while the thread that is performing blocks 420-480.

At block 430, an offset value in the selected entry is replaced with the offset value included in the write request.

At block 440, a first LBA value, in the selected entry, that is indicated as free is identified and the selected free space log entry is updated to indicate that the block referenced by that first LBA value is no longer free. Block 440 may involve switching, in the selected entry, a bit from 1 to 0 or vice versa, or changing the value of a free indicator byte in the selected entry.

At block 450, a second LBA value in the selected entry is replaced with a particular LBA value that is associated with (in offset table 310) the offset value included in the write request. Thus, block 450 (or a previous block) may involve searching offset table 310 for the particular LBA value that is associated with the offset value.

At block 460, the selected entry is updated to indicate that the block referenced by the (newly updated) second LBA value is free.

At block 470, the contents of the input buffer are written to the block (in application data 32) that is referenced by the first LBA value.

At block 480, the particular LBA value in offset table 310 that is associated with the offset value in the write request is replaced with the first LBA value. Block 480 may also involve releasing a lock on the selected entry if process 400 previously included obtaining a lock on the selected entry. Releasing the lock allows other threads to use the selected entry to perform an out-of-place write.

Benefits

Embodiments include at least the following benefits. First, core logic to maintain atomicity is maintained outside the database stack. The database software does not have to be rewritten to understand persistent memory. Second, only a single copy between a persistent memory buffer and the I/O buffer is needed to address the atomicity coverage gap. No extra copies are needed for logging or otherwise.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
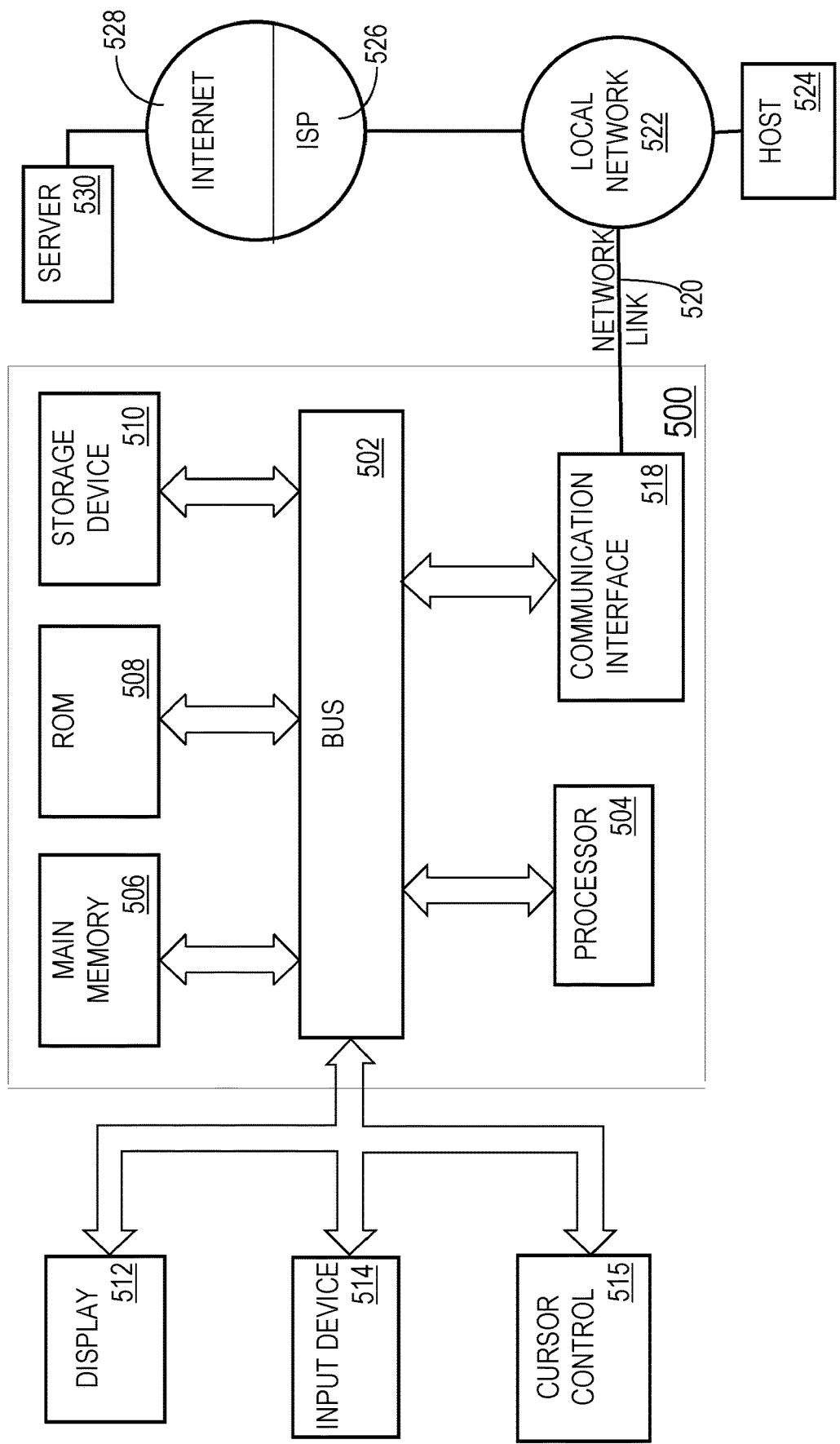
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic, or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Software Overview

FIG. 6 is a block diagram of a basic software system 600 that may be employed for controlling the operation of computer system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computer system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
storing, for a file, an offset table, a free space log, and application data that stores content of the file;
wherein the offset table includes a first plurality of entries, each entry of a subset of the first plurality of entries being associated with a different offset value and storing a logical block address (LBA) that references a location in the application data;
wherein the free space log includes a second plurality of entries, each entry of a subset of the second plurality of entries (1) comprising two logical block addresses that reference locations in the application data and (2) indicating that at least one of the two logical block addresses is free;
receiving a request to update the file, wherein the request includes an input buffer;
in response to receiving the request:
identifying a first entry, in the offset table, that comprises a particular LBA;
identifying a second entry, in the free space log, that comprises a first LBA and a second LBA and that indicates that the first LBA is free;
replacing the second LBA in the second entry with the particular LBA from the first entry;
writing the input buffer to a location, in the application data, that the first LBA references;
replacing the particular LBA in the first entry with the first LBA;
wherein the method is performed by one or more computing devices.

2. The method of claim 1, wherein identifying the second entry comprises analyzing the free space log until an entry, in the free space log, is found that is not locked.

3. The method of claim 2, further comprising:
after identifying the second entry and prior to replacing the second LBA, obtaining, by a first thread, a lock on the second entry to prevent another thread from accessing the second entry while the first thread has the lock on the second entry;
after replacing the particular LBA with the first LBA, releasing, by the first thread, the lock on the second entry.

4. The method of claim 1, wherein the second entry also indicates an offset value, the method further comprising:
replacing the offset value in the second entry with a particular offset value of the first entry prior to writing the input buffer to the location.

5. The method of claim 1, further comprising:
in response to detecting a crash, analyzing the free space log, wherein analyzing the free space log comprises, for each entry in the second plurality of entries:
identifying, in said each entry, a particular offset value;
identifying, in the offset table, a certain LBA that is mapped at the particular offset value;
determining whether the certain LBA is indicated as free in said each entry;

if it is determined that the certain LBA is indicated as free in said each entry, then updating said each entry to indicate that another LBA indicated in said each entry is free.

6. The method of claim 1, further comprising:
batching a plurality of write requests, each including a different input buffer;
processing the plurality of write requests concurrently, wherein processing the plurality of write requests concurrently comprises:
identifying a plurality of entries, in the free space log, that are unlocked;
locking the plurality of entries;
after locking the plurality of entries:
updating the plurality of entries and the offset table based on the plurality of write requests;
writing the plurality of input buffers to the application data.

7. The method of claim 1, wherein:
the request also includes a particular offset value that points to the first entry;
identifying the first entry comprises identifying the first entry based on the particular offset value.

8. The method of claim 1, wherein replacing the particular LBA in the first entry with the first LBA is performed after writing the input buffer to the location completes.

9. The method of claim 1, wherein writing the input buffer to the location is performed after replacing the second LBA with the particular LBA.

10. A method comprising:
storing, for a file, an offset table and application data that stores content of the file;
wherein the offset table includes a first plurality of entries, each entry of a subset of the first plurality of entries being associated with a different offset value and storing a logical block address (LBA) that references a location in the application data;
receiving a request to update the file, wherein the request includes an input buffer and an offset value;
in response to receiving the request:
identifying an offset entry, in the offset table, that corresponds to the offset value and comprises a first LBA;
identifying a second LBA that is considered free;
replacing the second LBA with the first LBA from the offset entry;
writing the input buffer to a location, in the application data, that the second LBA references;
replacing the first LBA in the offset entry with the second LBA;
wherein the method is performed by one or more computing devices.

11. The method of claim 10, further comprising:
prior to and concurrent to receiving the request, storing a free space list for the file;
wherein identifying the second LBA comprises identifying a free space entry, in the free space list, that comprises the second LBA;
wherein replacing the second LBA with the first LBA comprises replacing the second LBA in the free space entry with the first LBA from the offset entry.

12. One or more non-transitory storage media storing instructions which, when executed by one or more computing devices, cause:
storing, for a file, an offset table, a free space log, and application data that stores content of the file;
wherein the offset table includes a first plurality of entries, each entry of a subset of the first plurality of entries being associated with a different offset value and storing a logical block address (LBA) that references a location in the application data;
wherein the free space log includes a second plurality of entries, each entry of a subset of the second plurality of entries (1) comprising two logical block addresses that reference locations in the application data and (2) indicating that at least one of the two logical block addresses is free;
receiving a request to update the file, wherein the request includes an input buffer;
in response to receiving the request:
identifying a first entry, in the offset table, that comprises a particular LBA;
identifying a second entry, in the free space log, that comprises a first LBA and a second LBA and that indicates that the first LBA is free;
replacing the second LBA in the second entry with the particular LBA from the first entry;
writing the input buffer to a location, in the application data, that the first LBA references;
replacing the particular LBA in the first entry with the first LBA.

13. The one or more storage media of claim 12, wherein identifying the second entry comprises analyzing the free space log until an entry, in the free space log, is found that is not locked.

14. The one or more storage media of claim 13, wherein the instructions, when executed by the one or more computing devices, further cause:
after identifying the second entry and prior to replacing the second LBA, obtaining, by a first thread, a lock on the second entry to prevent another thread from accessing the second entry while the first thread has the lock on the second entry;
after replacing the particular LBA with the first LBA, releasing, by the first thread, the lock on the second entry.

15. The one or more storage media of claim 12, wherein the second entry also indicates an offset value, wherein the instructions, when executed by the one or more computing devices, further cause:
replacing the offset value in the second entry with a particular offset value of the first entry prior to writing the input buffer to the location.

16. The one or more storage media of claim 12, wherein the instructions, when executed by the one or more computing devices, further cause:
in response to detecting a crash, analyzing the free space log, wherein analyzing the free space log comprises, for each entry in the second plurality of entries:
identifying, in said each entry, a particular offset value;
identifying, in the offset table, a certain LBA that is mapped at the particular offset value;
determining whether the certain LBA is indicated as free in said each entry;
if it is determined that the certain LBA is indicated as free in said each entry, then updating said each entry to indicate that another LBA indicated in said each entry is free.

17. The one or more storage media of claim 12, wherein the instructions, when executed by the one or more computing devices, further cause:
batching a plurality of write requests, each including a different input buffer;

processing the plurality of write requests concurrently, wherein processing the plurality of write requests concurrently comprises:
  identifying a plurality of entries, in the free space log, that are unlocked;
  locking the plurality of entries;
  after locking the plurality of entries:
    updating the plurality of entries and the offset table based on the plurality of write requests;
    writing the plurality of input buffers to the application data.

18. The one or more storage media of claim 12, wherein:
the request also includes a particular offset value that points to the first entry;
identifying the first entry comprises identifying the first entry based on the particular offset value.

19. The one or more storage media of claim 12, wherein replacing the particular LBA in the first entry with the first LBA is performed after writing the input buffer to the location completes.

20. The one or more storage media of claim 12, wherein writing the input buffer to the location is performed after replacing the second LBA with the particular LBA.

\* \* \* \* \*